United States Patent [19]
Yamaguchi

[11] Patent Number: 5,690,288
[45] Date of Patent: Nov. 25, 1997

[54] DUAL BEARING TYPE FISHING REEL HAVING A ONE-WAY CLUTCH MOUNTED RADIALLY OUTWARD OF THE SPOOL

[75] Inventor: Nobuyuki Yamaguchi, Tokyo, Japan

[73] Assignee: Daiwa Seiko, Inc., Tokyo, Japan

[21] Appl. No.: 687,913

[22] Filed: Jul. 29, 1996

[30] Foreign Application Priority Data

Aug. 8, 1995 [JP] Japan ................. 7-222496

[51] Int. Cl.$^6$ ........................................ A01K 89/033
[52] U.S. Cl. ..................... 242/268; 242/298; 242/310
[58] Field of Search ........................ 242/268, 310, 242/321, 302, 298

[56] References Cited

U.S. PATENT DOCUMENTS

| | | | |
|---|---|---|---|
| 1,554,786 | 9/1925 | Case | 242/268 |
| 3,612,437 | 10/1971 | Allebach | 242/268 |
| 4,775,113 | 10/1988 | Emura et al. | 242/268 |
| 5,018,682 | 5/1991 | Aoki | 242/268 |
| 5,285,985 | 2/1994 | Sakaguchi | 242/302 |

FOREIGN PATENT DOCUMENTS

| | | |
|---|---|---|
| 4-24458 | 2/1992 | Japan. |
| 4-94970 | 8/1992 | Japan. |

*Primary Examiner*—Katherine Matecki
*Attorney, Agent, or Firm*—Sughrue,Mion,Zinn,Macpeak & Seas, PLLC

[57] ABSTRACT

In a dual bearing type reel, a one way clutch (38) is disposed so that the compactness and the balance of the reel are improved. The dual bearing type reel includes a spool (30) supported for rotation by a reel body between left and right side plates (14L, 14R). The rolling type one way clutch is provided for preventing reverse rotation of a handle (20) when the spool is rotated by a drive mechanism to wind the fishline. The rolling type one way clutch is provided within a supporting portion (36) which is disposed in a space (SP) between the left and right side plates of the reel body. In particular, the space is located radially outward from the outer surface of the spool.

7 Claims, 2 Drawing Sheets

DUAL BEARING TYPE FISHING REEL HAVING A ONE-WAY CLUTCH MOUNTED RADIALLY OUTWARD OF THE SPOOL

BACKGROUND OF THE INVENTION

The invention relates to a dual bearing type reel.

A one way clutch provided around a drive shaft connected to a handle is known for example from Unexamined Japanese Utility Model Publications (Kokai) 4-94970 and 4-24458 as a reverse rotation preventing device for preventing a reverse rotation of a spool. Such a spool is supported for rotation between side plates of a reel body. The reverse rotation corresponds to a direction opposite to a rotational direction for winding a fishline.

According to the first of these two publications, the one way clutch is supported by a cylindrical portion which extends outwardly from an outer plate of one of the side plates of the reel body to enclose the drive shaft. According to the latter publication the drive shaft end portion and the one way clutch arranged therearound are housed within a supporting portion that is a thick portion of an inner plate, which in turn is a portion of a frame of the side plates of the reel body, and extend from the inner plate in the direction of an the outer plate of the frame.

However, in both prior art designs, because of the construction in which a one way clutch is provided on the drive shaft that is provided within a gear box defined by the inner and outer plates of the reel side plate, the width of the gear box is relatively large. As a result, the handle at the end of the drive shaft is positioned relatively far out from the reel body, which decreases the compactness of the fishing in the widthwise direction. It additionally deteriorates lateral balance of the reel about the rod attachment portion of the reel body, which results in the fishline winding operation being unstable.

SUMMARY OF THE INVENTION

Therefore, the objective of the invention is to arrange a one way clutch in such a way that the compactness and the balance of the reel are improved.

To achieve the objective of the invention, there is provided a dual bearing type reel comprising a spool supported for rotation by a reel body between left and right side plates, and a rolling type one way clutch for preventing reverse rotation of a handle, in a direction opposite to the fishline winding direction. The handle is connected to a drive shaft, and, when the handle is rotated, the spool rotates to wind fishline by a means of a drive mechanism which operates with the rotation of the drive shaft. The rolling type one way clutch is provided within a supporting portion that is disposed at a radially outer position from the outer surface of the spool and is held by the reel body between the left and right side plates of the reel body.

The reel body is provided with a space between the left and right side plates for accommodating the spool, and the space has roughly the same width as the spool. The supporting portion is placed in the same space provided for the spool. More specifically the supporting portion is disposed at a position radially outward from the outer surface of the spool. Therefore, the width of the reel lateral (left-right) direction is reduced, rendering the reel more compact. In addition, the handle juts out less in the lateral direction so that the lateral balance of the reel body about the rod attachment portion is improved.

DETAILED DESCRIPTION OF THE PREFERRED EMBODIMENTS

The invention will be described hereinafter in detail with reference to the embodiments illustrated in the attached drawings.

Figure 1:
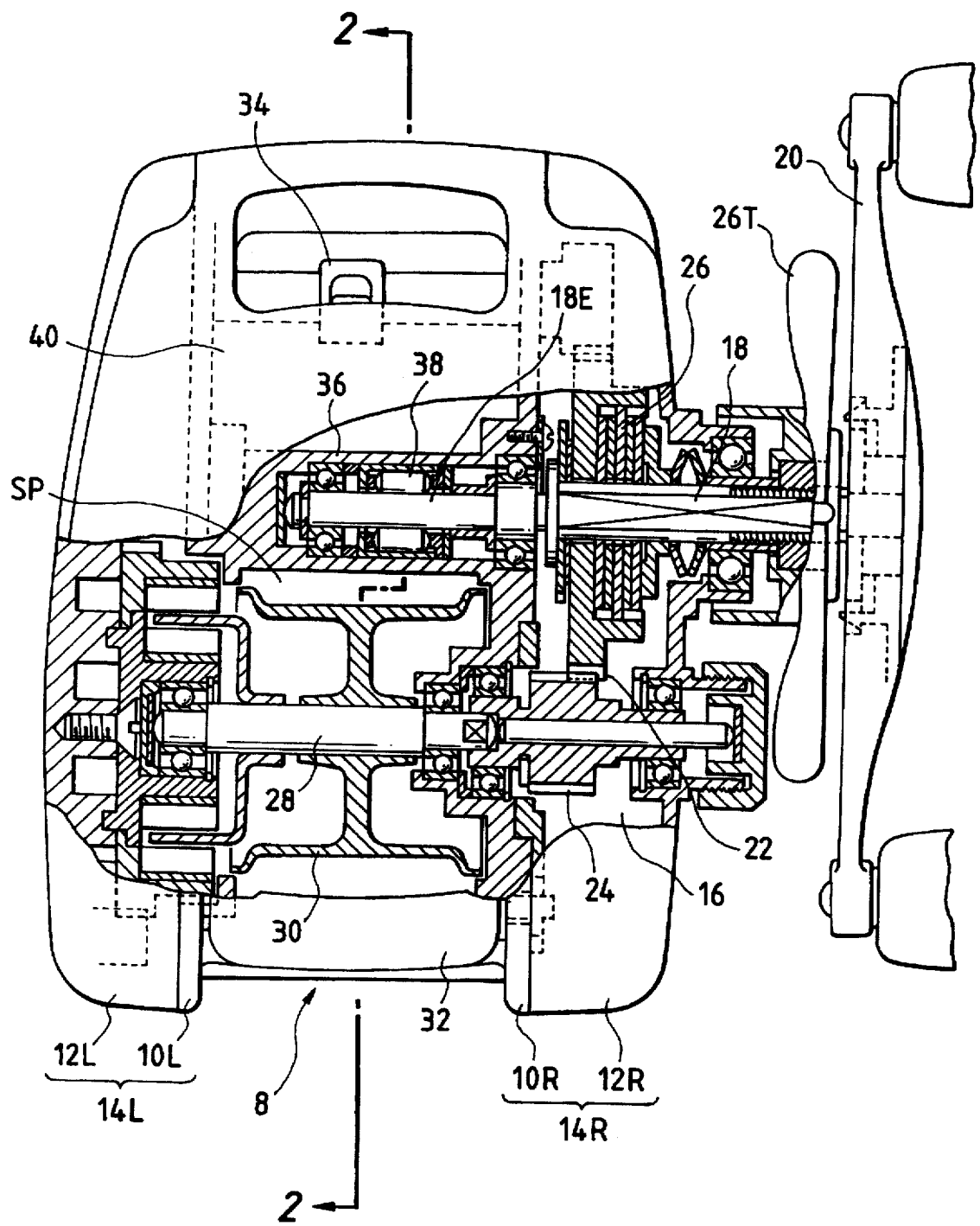
FIG. 1 is a partially sectional plan view of a dual bearing type reel according to a first embodiment of the invention.
Figure 2:
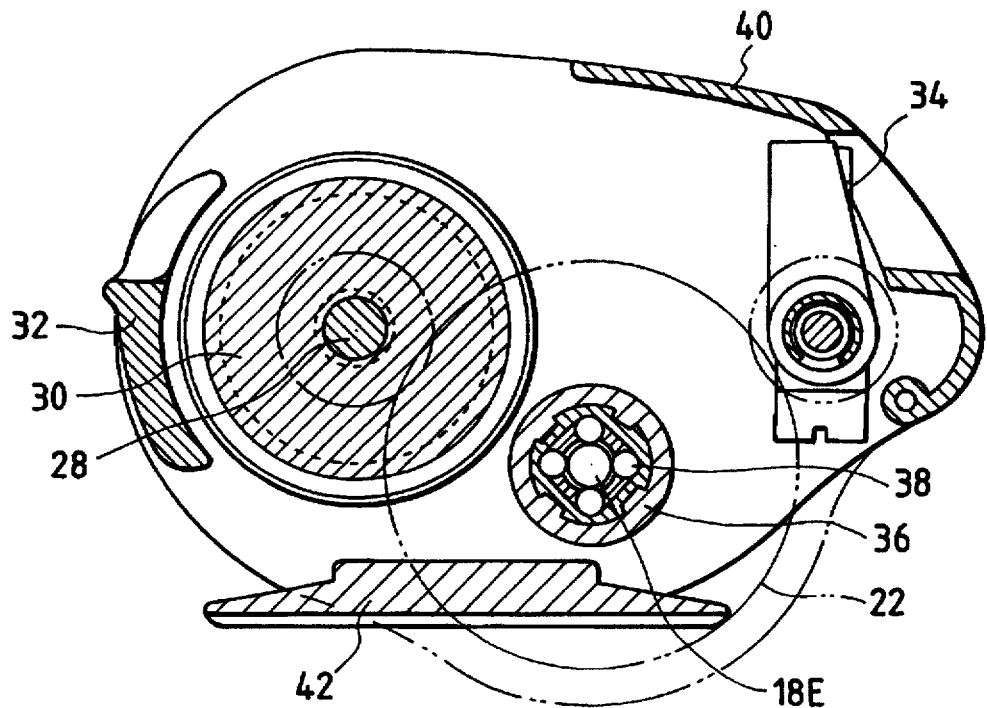
FIG. 2 is a sectional view along a line 2—2 in FIG. 1.

FIG. 1 is a partial sectional top view of a dual bearing type reel according to the invention, and FIG. 2 is longitudinal section along a line 2—2 in FIG. 1. A reel body 8 has left and right side plates 14L and 14R between which a space SP having a given width is provided. A spool shaft 28 extends between the side plates and is supported by bearings for rotation, while a spool 30 is mounted on the spool shaft for rotation therewith.

The left side plate 14L has a left outer plate 12L and a left inner plate 10L (a portion of a frame), the right side plate 14R has a right outer plate 12R and a right inner plate 10R (a portion of the frame). A drive shaft 18, on the outer end of which a handle 20 is mounted, extends through the right side plate 14R. A gear space 16 is provided within the right side plate 14R to house a drive gear 22 that is mounted on the drive shaft 18 and a pinion 24 that is mounted on the spool shaft and meshes with the drive gear 22. The drive gear 22 presses against a brake device 26 for braking the reverse rotation of the spool, that is, the rotation of the spool for feeding the fishline.

Reference numeral 26T denotes a braking force adjuster, and 32 denotes a clutch operating member for releasing the engagement between the drive gear 22 and the pinion 24 to allow the free rotation of the spool. Reference numeral 40 denotes a cover for limiting access to a portion of the fishline extending from the spool 30 to a level winding device 34. A rod attachment portion is shown at reference numeral 42 in FIG. 2.

A cylindrical supporting portion 36 is provided in parallel to the spool shaft 28 between the two inner plates 10R and 10L at a radially outer position of the spool 30, that is, in FIG. 1 above the spool. The supporting portion 36 is fixed to the reel body and has an opening at the right end into which an extension portion 18E of the drive shaft 18 is inserted. A rolling type one way clutch 38 is provided between the extension portion 18E and the cylindrical supporting portion 36.

The width of the reel does not extend greatly in the rightward direction, and thus the reel remains compact. This is achieved by providing the cylindrical supporting portion 36 together with the one way clutch 38 in the space SP for the spool. Since the SP has a predetermined width sufficient for receiving the portion 36, it is not necessary to increase the width of the gear space 16 in the right side plate. Further, the handle 20 need not extend as far out from the rod attachment portion 42 at the center portion of the reel between the two side plates 10L and 10R. Consequently the winding operation of the fishline is rendered more stable. Furthermore, the one way clutch is protected to a greater extent from corrosion, since the one way clutch is disposed at a position set back from the opening in the right side plate 12R for receiving the drive shaft, through which opening sea water, water, dust, etc. are likely to enter and adhere.

Figure 3:
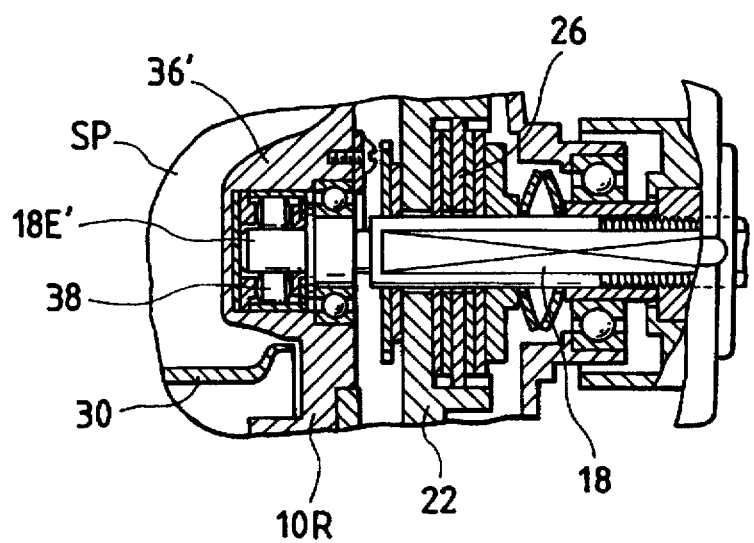
FIG. 3 is a sectional view of a maim portion of a dual bearing type reel according to a second embodiment.

FIG. 3 illustrates a main portion of a second embodiment of the invention. In this embodiment, a supporting portion 36' extends from the right inner side plate 10R into the space SP without extending all the way over to the left inner side plate 10L. An extension portion 18E' of the drive shaft 18 is inserted into the supporting portion 36', and the one way clutch 38 is provided therebetween. In this embodiment as in the first embodiment, the space SP is used to house the supporting portion. Since the space SP must be provided anyway, to house the spool, space in other areas within the reel body can be conserved. Specifically, the inventive arrangement permits a reduction in the size of the gear space in the right side plate 12R and makes the reel overall compact in size. Further, the uneven disposition of the handle on the right side is reduced thereby stabilizing the operation of the reel. Furthermore, the resistance of the one way clutch to corrosion is improved since the one way clutch is disposed at a position away from the opening in the right side plate 12R for receiving the drive shaft, through which opening sea water, water, dust, etc. are likely to enter and adhere.

The location of the supporting portion 36, 36' is not restricted to the embodiments illustrated in the drawings. For example, if the handle 20 and thus the extension portion 18E, 18E' are provided behind of the spool 30, then the supporting portion 36, 36' is provided at a backward position of the reel body with respect to the spool 30.

Further, the supporting portion 36 may extend into a space between the left outer plate 12L and the left inner plate 10L so that the one way clutch 38 is interposed between the supporting portion 36 and the extension portion 18E within the space between the left outer plate 12L and the left inner plate 10L. In this case also, the one way clutch can be disposed without increasing the size of the gear space of the right side plate 14R.

As apparent from the description, according to the invention, a fishing reel must be provided with a space corresponding to a spool width for installing the spool. By using this space to house the supporting portion such that the supporting portion is disposed at a position radially outward from the outer surface of the spool it becomes possible to render the fishing reel more compact and more functional. In particular, the width of the gear box (side plate) need not be increased, and the handle can be positioned closer to the spool, to make it possible to better balance the reel in the right and left directions with respect to the mounting portion for the rod, and to make the operation of the handle more stable. Furthermore, the risk of corrosion to the one way clutch is reduced since the one way clutch is disposed at a position setback from the opening in the right side plate for receiving the drive shaft, through which opening sea water, water, dust, etc. enter and adhere.

What is claimed is:

1. A dual bearing fishing reel comprising:
   a spool supported for rotation by a reel body and located between first and second side plates;
   a handle connected to a drive shaft for rotating said spool through a drive mechanism to wind a fishline onto said spool, said handle being located opposite from the second side plate with respect to the first side plate;
   a one way clutch for preventing a reverse rotation of said handle opposite to a fishline winding direction when said spool is rotated; and
   a supporting portion disposed in a space that is external to and radially outward from said spool, that is opposite from said handle with respect to the first side plate and that is between the first and the second side plate,
   wherein said supporting portion defines an internal space enclosed by said supporting portion and isolated from the external space, and
   wherein said one way clutch is disposed in the internal space within said supporting portion.

2. A dual bearing fishing reel according to claim 1, wherein said supporting portion protrudes from the first side plate toward the second side plate, and
   wherein the internal space is defined by a blind hole in said supporting portion for receiving said one-way clutch.

3. A dual bearing fishing reel according to claim 1, wherein said supporting portion is concentric with the drive shaft.

4. A dual bearing fishing reel according to claim 1, wherein the drive shaft extends into said supporting portion.

5. A dual bearing fishing reel according to claim 1, wherein at least a portion of said one way clutch is disposed radially outward from said spool.

6. A dual bearing fishing reel according to claim 1, wherein said one way clutch is disposed entirely radially outward from said spool.

7. A dual bearing fishing reel, comprising:
   a spool supported for rotation by a reel body and located between first and second side plates;
   a handle connected to a drive shaft for rotating said spool through a drive mechanism to wind a fishline onto said spool, said handle being located opposite from the second side plate with respect to the first side plate;
   a one way clutch for preventing a reverse rotation of said handle opposite to a fishline winding direction when said spool is rotated; and
   a supporting portion disposed in a space radially outward from said spool and opposite from said handle with respect to the first side plate,
   wherein said one way clutch is disposed within said supporting portion, and
   wherein said supporting portion extends between the first and the second side plate.

* * * * *